United States Patent
Lund

(10) Patent No.: US 9,639,623 B2
(45) Date of Patent: May 2, 2017

(54) METHOD FOR REMOTELY CONTROLLING A VIDEO PLAYING WITHIN A FIRST WEB PAGE AT A FIRST DEVICE FROM A SECOND DEVICE USING A DOCUMENT OBJECT MODEL

(71) Applicant: Cable Television Laboratories, Inc., Louisville, CO (US)

(72) Inventor: Robert Lund, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 835 days.

(21) Appl. No.: 13/721,356

(22) Filed: Dec. 20, 2012

(65) Prior Publication Data

US 2014/0181631 A1 Jun. 26, 2014

(51) Int. Cl.
G06F 17/00 (2006.01)
G06F 17/30 (2006.01)
H04L 29/08 (2006.01)
H04N 21/41 (2011.01)
G06F 9/44 (2006.01)

(52) U.S. Cl.
CPC ........ *G06F 17/3089* (2013.01); *G06F 9/4445* (2013.01); *G06F 17/30873* (2013.01); *H04L 67/02* (2013.01); *H04L 67/10* (2013.01); *H04N 21/4126* (2013.01); *G06F 2216/15* (2013.01)

(58) Field of Classification Search
CPC ..... H04L 67/1095; H04L 67/10; H04L 67/02; G06F 17/30873; G06F 2216/15; G06F 9/4445; G06F 17/3089; H04N 21/4126
See application file for complete search history.

(56) References Cited

U.S. PATENT DOCUMENTS

| | | | |
|---|---|---|---|
| 6,253,228 B1 * | 6/2001 | Ferris et al. | 709/203 |
| 6,295,551 B1 * | 9/2001 | Roberts et al. | 709/205 |
| 6,763,226 B1 | 7/2004 | McZeal | |
| 6,938,212 B2 * | 8/2005 | Nakamura | 715/748 |
| 7,127,676 B2 * | 10/2006 | Linsey et al. | 715/738 |
| 7,149,776 B1 * | 12/2006 | Roy et al. | 709/205 |
| 7,177,902 B2 * | 2/2007 | Hubbard | 709/203 |
| 7,225,225 B2 * | 5/2007 | Kuki et al. | 709/205 |
| 7,263,710 B1 * | 8/2007 | Hummel et al. | 725/86 |
| 7,353,454 B2 * | 4/2008 | Lowe et al. | 715/740 |
| 7,370,269 B1 * | 5/2008 | Prabhu et al. | 715/230 |

(Continued)

OTHER PUBLICATIONS

Changhong, W. et al.,"Web-based Remote Control Service System," © 2003, IEEE, pp. 337-341.*

(Continued)

*Primary Examiner* — Cesar Paula
*Assistant Examiner* — James H Blackwell
(74) *Attorney, Agent, or Firm* — Great Lakes Intellectual Property, PLLC

(57) ABSTRACT

Administration of a Web page is contemplated. The contemplated administration may be used to facilitate identifying state of a Web page at a first device from a remotely located second device, optionally independently of a Web server that downloads the Web page to the device. The contemplated administration may be used to facilitate changing state of Web page as provided through the first device from the remotely located second device, optionally independent of the Web server that downloads the Web page to the device.

19 Claims, 5 Drawing Sheets

(56) References Cited

U.S. PATENT DOCUMENTS

| | | | |
|---|---|---|---|
| 7,434,229 B2* | 10/2008 | Barinov et al. | 719/318 |
| 7,568,120 B2* | 7/2009 | Gale et al. | 714/4.1 |
| 7,904,061 B1* | 3/2011 | Zaffino | G11B 27/105 |
| | | | 455/414.1 |
| 7,930,721 B1* | 4/2011 | Hernes | H04N 7/17318 |
| | | | 725/78 |
| 8,225,191 B1 | 7/2012 | Kalman | |
| 8,225,197 B1 | 7/2012 | Szewczyk | |
| 8,554,938 B2* | 10/2013 | Mittal | 709/230 |
| 8,752,183 B1* | 6/2014 | Heiderich et al. | 726/25 |
| 8,769,016 B2* | 7/2014 | Jakobson | 709/204 |
| 8,769,017 B2* | 7/2014 | Jakobson | 709/204 |
| 8,799,757 B2 | 8/2014 | Jewsbury | |
| 8,806,024 B1* | 8/2014 | Toba Francis et al. | 709/227 |
| 8,843,816 B2* | 9/2014 | Stull et al. | 715/203 |
| 8,868,533 B2* | 10/2014 | Powell et al. | 707/705 |
| 2002/0138624 A1* | 9/2002 | Esenther | 709/227 |
| 2002/0152464 A1 | 10/2002 | Kitsukawa | |
| 2003/0025732 A1* | 2/2003 | Prichard | 345/765 |
| 2003/0220989 A1* | 11/2003 | Tsuji et al. | 709/220 |
| 2004/0025171 A1* | 2/2004 | Barinov et al. | 719/318 |
| 2005/0044145 A1* | 2/2005 | Quinn et al. | 709/205 |
| 2005/0138122 A1* | 6/2005 | Boehringer et al. | 709/205 |
| 2005/0246422 A1* | 11/2005 | Laning | 709/205 |
| 2005/0262231 A1* | 11/2005 | Lowe et al. | 709/223 |
| 2005/0289156 A1* | 12/2005 | Maryka | G06F 17/30905 |
| 2007/0300252 A1 | 12/2007 | Acharya | |
| 2009/0037517 A1* | 2/2009 | Frei | 709/202 |
| 2009/0233593 A1* | 9/2009 | Ergen | H04M 1/72533 |
| | | | 455/420 |
| 2009/0271713 A1 | 10/2009 | Stull | |
| 2010/0082746 A1* | 4/2010 | Ulrich et al. | 709/204 |
| 2010/0135279 A1 | 6/2010 | Petersson | |
| 2010/0218105 A1* | 8/2010 | Perov et al. | |
| 2010/0306642 A1* | 12/2010 | Lowet et al. | 715/234 |
| 2011/0022943 A1 | 1/2011 | Bou-Ghannam et al. | |
| 2011/0061080 A1 | 3/2011 | Hill | |
| 2011/0209177 A1 | 8/2011 | Sela | |
| 2011/0282962 A1* | 11/2011 | Suzuki | 709/208 |
| 2012/0005311 A1* | 1/2012 | Livingston | G06F 21/6218 |
| | | | 709/219 |
| 2012/0054616 A1* | 3/2012 | Mittal | G06F 17/30899 |
| | | | 715/722 |
| 2012/0112986 A1* | 5/2012 | McCoy et al. | 345/2.3 |
| 2012/0173966 A1 | 7/2012 | Powell | |
| 2012/0210242 A1* | 8/2012 | Burckart et al. | 715/744 |
| 2012/0210243 A1* | 8/2012 | Uhma et al. | 715/744 |
| 2012/0278697 A1* | 11/2012 | Yokoyama et al. | 715/234 |
| 2012/0278699 A1 | 11/2012 | Benjamin et al. | |
| 2012/0290913 A1* | 11/2012 | Benraz | 715/222 |
| 2012/0311430 A1* | 12/2012 | Seo et al. | 715/234 |
| 2012/0317487 A1* | 12/2012 | Lieb et al. | 715/730 |
| 2013/0218964 A1* | 8/2013 | Jakobson | 709/204 |
| 2013/0218966 A1* | 8/2013 | Jakobson | 709/204 |
| 2013/0239149 A1* | 9/2013 | Kim et al. | 725/59 |
| 2014/0019534 A1* | 1/2014 | Handrigan et al. | 709/204 |

OTHER PUBLICATIONS

Unknown, "How Browsers Work," archived Feb. 20, 2010, downloaded from WayBack Machine <"https://web.archive.org/web/20100220000649/http://taligarsiel.com/Projects/howbrowserswork1.htm">, 38 total pages.*

International Search Report (ISR) and Written Opinion of corresponding PCT application.

* cited by examiner

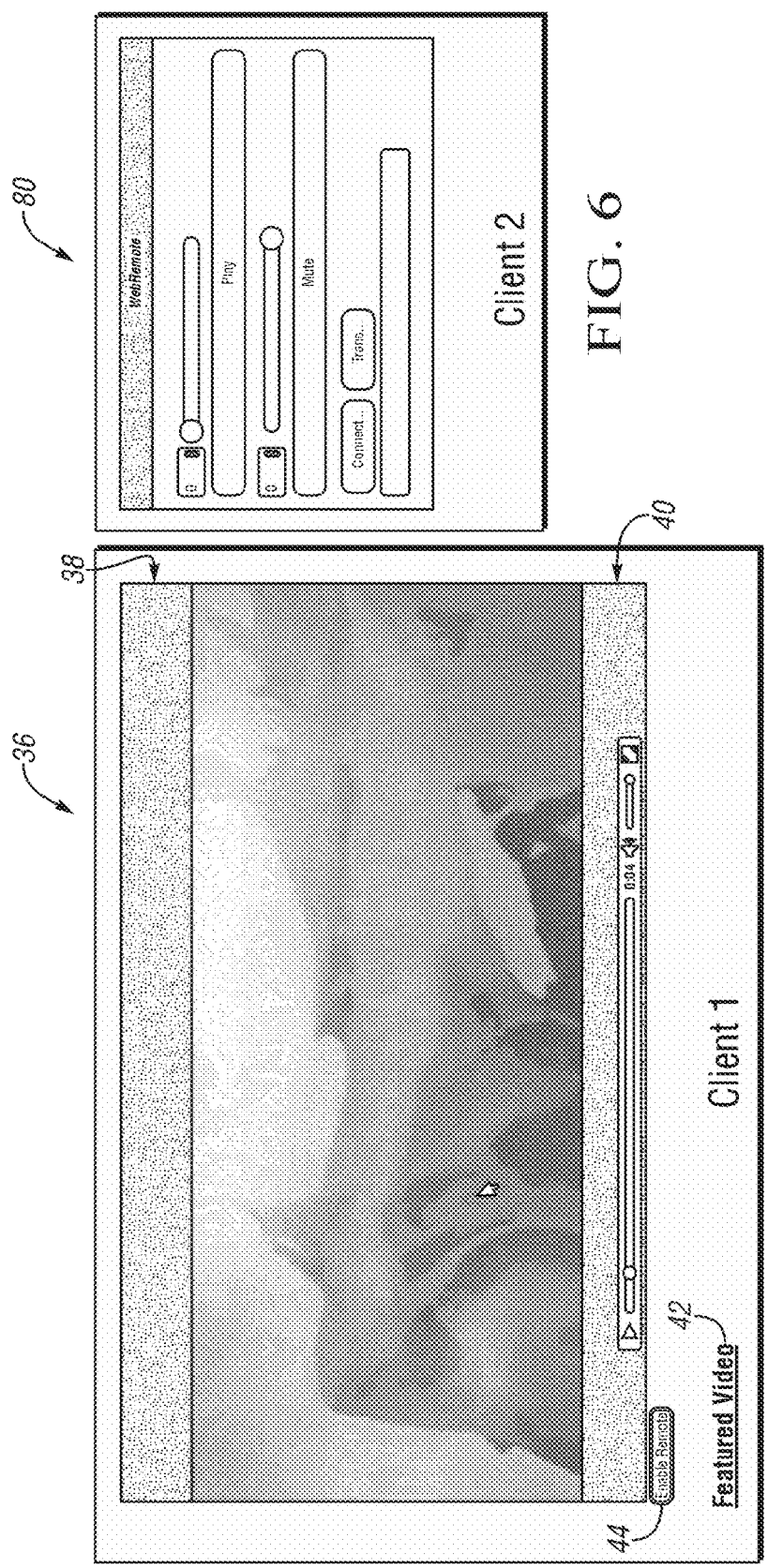

METHOD FOR REMOTELY CONTROLLING A VIDEO PLAYING WITHIN A FIRST WEB PAGE AT A FIRST DEVICE FROM A SECOND DEVICE USING A DOCUMENT OBJECT MODEL

TECHNICAL FIELD

The present invention relates to Web pages, such as but not necessary limited to Web pages downloaded from a Web server or other entity for rendering with a Web browser or other application having capabilities sufficient to facilitate interfacing the Web page with a user.

BACKGROUND

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. FIG. 1 graphically represents a Document Object Model (DOM) as provided by the World Wide Web consortium, which can be found at http://www.w3.org/TR/DOM-Level-2-Core/introduction.html. (The figure and some of the related description provided hereinafter are subject to Copyright (c) Nov. 13, 2000, World Wide Web Consortium, (Massachusetts Institute of Technology, European Research Consortium for Informatics and Mathematics, Keio University). All Rights Reserved. http://www.w3.org/Consortium/Legal/2002/copyright-documents-20021231)

The DOM is a representation of a valid HTML and well-formed XHTML document. It defines the logical structure of documents and the way a document is accessed and manipulated. In the DOM specification, the term "document" is used in the broad sense—increasingly, XML is being used as a way of representing many different kinds of information that may be stored in diverse systems, and much of this would traditionally be seen as data rather than as documents. Nevertheless, XML presents this data as documents, and the DOM may be used to manage this data.

With the Document Object Model, programmers can build documents, navigate their structure, and add, modify, or delete elements and content. Anything found in an HTML or XHTML document can be accessed, changed, deleted, or added using the Document Object Model. As a W3C specification, one important objective for the Document Object Model is to provide a standard programming interface that can be used in a wide variety of environments and applications. The DOM is designed to be used with any programming language. The DOM is a programming API for documents. It is based on an object structure that closely resembles the structure of the documents it models. For instance, consider the table shown below, taken from an HTML document (Web page) and graphically represented in FIG. 1:

```
<TABLE>
<TBODY>
<TR>
<TD>Shady Grove</TD>
<TD>Aeolian</TD>
</TR>
<TR>
```

-continued

```
<TD>Over the River, Charlie</TD>
<TD>Dorian</TD>
</TR>
</TBODY>
</TABLE>
```

In the DOM, documents have a logical structure which is very much like a tree; to be more precise, which is like a "forest" or "grove", which can contain more than one tree. Each document contains zero or one doctype nodes, one root element node, and zero or more comments or processing instructions; the root element serves as the root of the element tree for the document. However, the DOM does not specify that documents must be implemented as a tree or a grove, nor does it specify how the relationships among objects be implemented. The DOM is a logical model that may be implemented in any convenient manner. In this specification, the term structure model is used to describe the tree-like representation of a document. The term "tree" is used when referring to the arrangement of those information items which can be reached by using "tree-walking" methods. One important property of DOM structure models is structural isomorphism: if any two Document Object Model implementations are used to create a representation of the same document, they will create the same structure model, in accordance with the XML Information Set. (Note: There may be some variations depending on the parser being used to build the DOM. For instance, the DOM may not contain whitespaces in element content if the parser discards them.)

The name "Document Object Model" was chosen because it is an "object model" in the traditional object oriented design sense: documents are modeled using objects, and the model encompasses not only the structure of a document, but also the behavior of a document and the objects of which it is composed. In other words, the nodes in the above diagram do not represent a data structure, they represent objects, which have functions and identity. As an object model, the DOM identifies: the interfaces and objects used to represent and manipulate a document; the semantics of these interfaces and objects—including both behavior and attributes; and the relationships and collaborations among these interfaces and objects.

The structure of Standard Generalized Markup Language (SGML) documents has traditionally been represented by an abstract data model, not by an object model. In an abstract data model, the model is centered around the data. In object oriented programming languages, the data itself is encapsulated in objects that hide the data. The functions associated with these objects determine how the objects may be manipulated, and they are part of the object model.

The Document Object Model is not a binary specification. DOM programs written in the same language binding will be source code compatible across platforms, but the DOM does not define any form of binary interoperability. The Document Object Model is not a way of persisting objects to XHTML or HTML. Instead of specifying how objects may be represented, the DOM specifies how XHTML and HTML documents are represented as objects, so that they may be used in object oriented programs. The Document Object Model is not a set of data structures; it is an object model that specifies interfaces. Although this document contains diagrams showing parent/child relationships, these are logical relationships defined by the programming interfaces, not representations of any particular internal data structures. The Document Object Model does not define what information in a document is relevant or how information in a document is structured. For XML, this is specified by the W3C XML Information Set. The DOM is simply an API to this information set.

The Document Object Model, despite its name, is not a competitor to the Component Object Model (COM). COM, like CORBA, is a language independent way to specify interfaces and objects; the DOM is a set of interfaces and objects designed for managing HTML and XML documents. The DOM may be implemented using language-independent systems like COM or CORBA; it may also be implemented using language-specific bindings like the Java or ECMAScript bindings specified in this document. The DOM originated as a specification to allow JavaScript scripts and Java programs to be portable among Web browsers. In the fundamental DOM interfaces, there are no objects representing entities. Numeric character references, and references to the pre-defined entities in HTML and XML, are replaced by the single character that makes up the entity's replacement.

The DOM specifies interfaces which may be used to manage XHTML or HTML documents. It is important to realize that these interfaces are an abstraction—much like "abstract base classes" in C++, they are a means of specifying a way to access and manipulate an application's internal representation of a document. Interfaces do not imply a particular concrete implementation. Each DOM application is free to maintain documents in any convenient representation, as long as the interfaces shown in this specification are supported. Some DOM implementations will be existing programs that use the DOM interfaces to access software written long before the DOM specification existed.

The proliferation of smartphones, tablets, laptops and televisions is creating the expectation and opportunity for a user experience to flow across these types of devices. At the same time, Web pages, such as but not necessarily limited to those using hyper transfer HyperText Markup Language (HTML) version 5 (HTML5) and related technologies, are increasingly viewed as an attractive means to deliver cloud based services to a wide range of network-connected devices for use of HTML and/or XML documents. HTML5 and Digital Living Network Alliance (DLNA) HTML5 remote user interface (RUI) are examples of various means contemplated by the present invention for multichannel video programming distributor (MVPDs), multiple system operators (MSOs) and other types of service providers to deliver their services through Web pages to a broad range of IP devices. In order for user experiences to flow across various types of IP devices, optionally when restrained to certain protocols/standards, a need exists for the devices and/or applications operable with the devices to enable multi-device use cases for various cloud-based services, such as but not necessarily limited to enabling multi-device use cases for remote control, discovery, collaboration and service migration.

BRIEF DESCRIPTION OF THE DRAWINGS

FIG. 4 illustrates a first visual representation of the Web page at the first client in accordance with one non-limiting aspect of the present invention.

FIG. 6 illustrates a control menu in accordance with one non-limiting aspect of the present invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
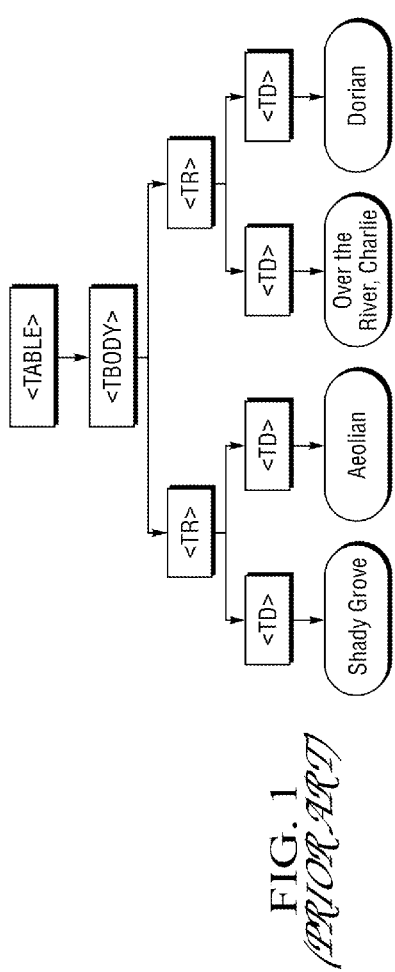
FIG. 1 graphically represents a Document Object Model (DOM).
Figure 2:
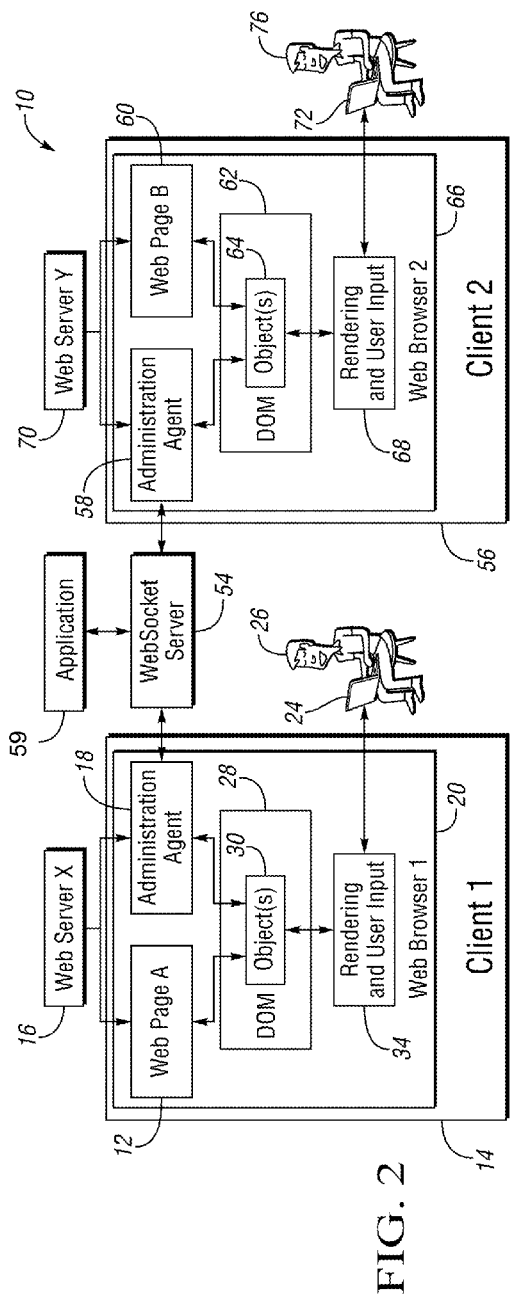
FIG. 2 illustrates a system configured to facilitate administrating Web pages in accordance with one non-limiting aspect of the present invention.

FIG. 2 illustrates a system 10 configured to facilitate administrating Web pages in accordance with one non-limiting aspect of the present invention. The contemplated Web page 12 may relate to any suitable document downloaded or otherwise transmitted to a first client 14 from a first Web server 16 or other remote entity. The Web pages may include applications, files, code, script, content, audio, video, software, etc. that combine to facilitate visual and/or non-visual representations of content associated with the corresponding Web page. The term "Web" is commonly used throughout the description of the present invention to reference any type of interaction between a server and a client over a network. To begin its presentation, the present invention is described with respect to administrating download of a Web page over the Internet as download of a Web page presents challenges particularly suitable to the administration contemplated by the present invention. This is done for exemplary non-limiting purposes and without necessarily intending to limit the scope and contemplation of the present invention. The present invention fully contemplates utilizing operations described below with respect to administrating a Web page for use in administrating other types of Web pages.

Administration of the Web page may be facilitated with an administration agent 18. The administration agent 18 may be configured to facilitate various operations contemplated by the present invention, including those associated with monitor, remote control, discovery, collaboration and service migration of the Web page 12. The client 14 may be a smartphone, tablet, laptop, set top box (STB), gateway, and/or television having a processor operable cooperation with a memory or other logically executing feature to facilitate performing and/or directing the operations and issuing instructions associated with the administration agent. The administration agent 18 may be a script or will other feature optionally embodied in a computer-readable medium having non-transitory instructions stored thereon that are sufficient for use with a processor or other instrument to facilitate the contemplated administration. The particular features of the client 14 and/or administration agent 18 may be varied according to the characteristics of the Web page(s)

12 being administered, which are for exemplary non-limiting purposes described with respect to those associated with facilitating visual representation of the Web page 12. These features may include a first Web browser 20 configured to facilitate rendering a related visual representation for output to a display 24 viewable by a first user 26.

The process of facilitating the visual representation of the Web page 12 may include the first Web browser 20 facilitating download of the first Web page 12 from the first Web server 16. The first Web browser 20 may create a document object model (DOM) 28, a model/view/controller or other analogous module based on the downloaded Web page 12. The DOM 28 may include a plurality of DOM objects 30 where some or all of the DOM objects 30 are created for rendering with the first Web browser 20 as part of processes associated with generating the visual representation of the Web page 12. One or more of the DOM objects 30 may include controllable attributes, e.g., attributes that are changeable between at least a first state and a second state. The current state of the controllable and non-controllable attributes may be used to dictate how the first Web browser 20 renders or otherwise presents at least part of the Web page 12 to the first user 26. For example, if the first Web browser 20 operates according to HTML5, the disclosure of which is hereby incorporated by reference in its entirety, the DOM 28 may be created according to the requirements of HTML5 and rendered by the first Web browser 20 according to a corresponding set of rules and/or regulations associated with HTML5 for translating the DOM objects 30. The protocol specific translation may define parameters related to facilitating the visual presentation of the Web page 12 and/or otherwise interfacing non-visual elements of the Web page 12.

Figure 3:
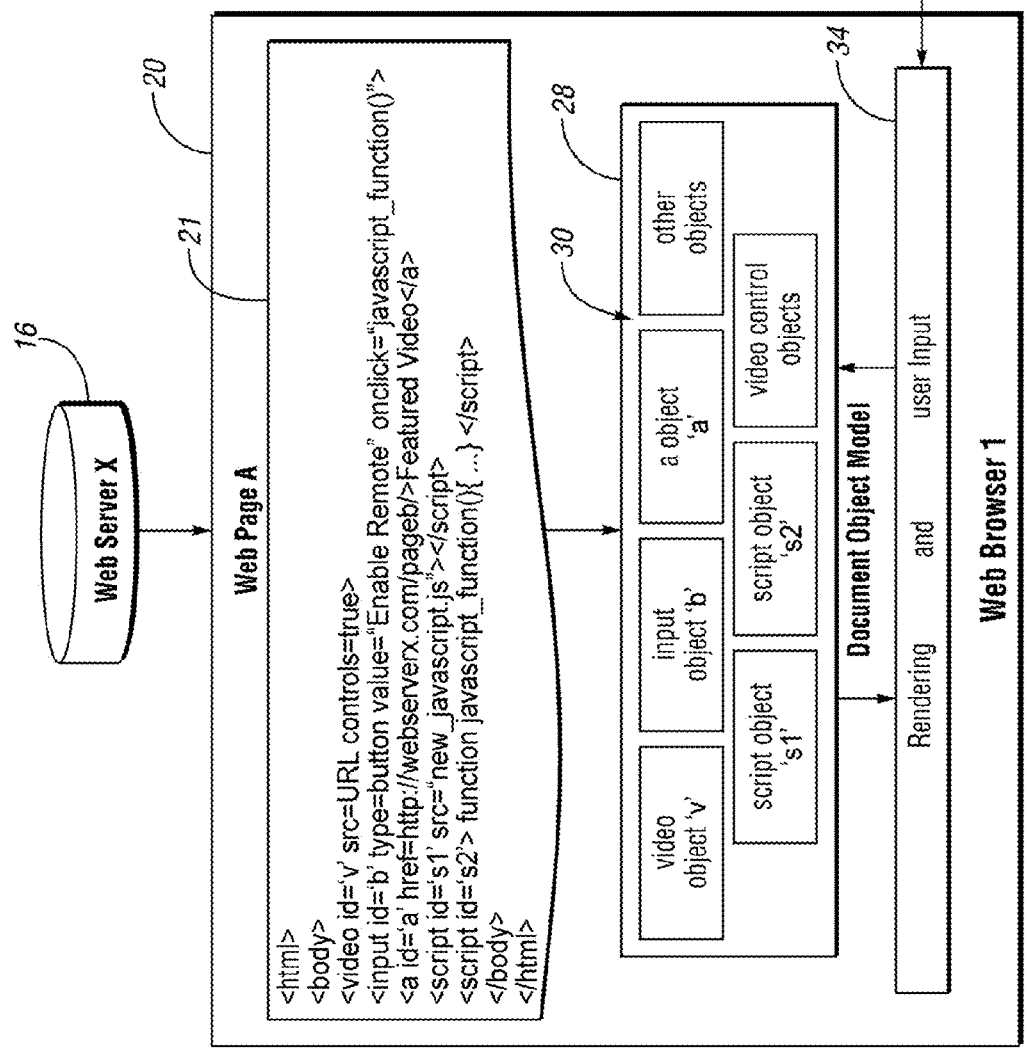
FIG. 3 schematically illustrates the first Web browser in accordance with one non-limiting aspect of the present invention.

FIG. 3 schematically illustrates the first Web browser 20 in accordance with one non-limiting aspect of the present invention. A partial view of the Web page 12 downloaded from the first Web server 16 is shown to illustrate a portion of the downloaded contents, e.g., the HTML code, scripts and other information associated with the Web page 12. The partial view is shown to be coded according to HTML but other codes and protocols may be used without deviating from the scope and contemplation of the present invention. The contents of the Web page 12 may be parsed or otherwise interpreted with the first Web browser 20 to generate the DOM 28 and the DOM objects 30 and to set states for the controllable attributes. An exemplary number of DOM objects are illustrated to correspond with a video object, and input object, a first script object, a second script object, a video control objects, a generic object and other objects. A human computer interface (HCI) 34 may be configured to control presentation of the Web page 12 to the first user 26 as a function of the states associated with the DOM objects 30. The first Web browser 20 may be configured to register or otherwise detect when one or more of the DOM objects 30 or corresponding attributes are adjusted and to implement a corresponding adjustment to the Web page presentation. Web pages 12 may be configured to support a virtually limit limitless number of controllable features, scripts, attributes, etc. that may require an association with a related DOM object 30.

FIG. 4 illustrates a first visual representation 36 of the Web page 12 at the first client 14 in accordance with one non-limiting aspect of the present invention. The first visual representation 36 may be generated by the first Web browser 20 for output to the display 24 according to an initial interpretation of the downloaded Web page 12. The first visual representation 36 is shown to include a video window 38, a video control menu 40, a featured video link 42, and an enable remote button 44. The video window 38 relates to the video object, the video control menu 40 relates to the video control object, the featured video link 42 relates to the generic object, and the enable remote button 44 relates to the input object. Following the initial presentation of the Web page 12, the Web page 12 may be manipulated, amongst other things, according to user interactions with the visually represented DOM objects, such as through HCI-based manipulation of one of the video control menu 40, the featured link 42 and the enable remote button 44, and/or through engagement of one of the non-visually represented DOM objects, such as one of the first script object and the second script object. The first and second script objects may be engaged based on manipulation of one of the visually represented DOM objects 30 and/or as a function of other triggering events, which may be prompted following virtually any type of measurable or detectable event.

The first visual representation 36 corresponds with the first Web browser 20 interpreting the downloaded Web page and acting according to an interpretation of the DOM objects 30. The DOM objects 30 may be relatively static at least in that, other than their attributes potentially changing, the number of DOM objects 30 occupying the DOM 28 may remain constant after initial DOM construction and until the Web page 12 is re-downloaded (DOM construction may occur anew at each download and/or some portions may be reused). The subsequent manipulation of DOM objects 30 can result in changes in the presentation associated with the first visual representation, optionally without requiring additional communications with the Web server 16 to re-construct the DOM 28 and/or to otherwise vary DOM objects/attributes. In some cases, such as with video streaming, continuous contact or sessions may be maintained with the first Web server 16 (or a video server) but this communication may not necessarily result in changes to the DOM objects 30 and/or generation of a new DOM 28. Changes to the first visual representation 36 may be considered to be implemented independently of the first Web server 16 when the corresponding presentation is altered without requiring the first Web server 16 to specify attributes or otherwise make adjustments to the DOM objects 30. While the present invention contemplates facilitating DOM objects 30 changes independently of the first Web server 16, it may be advantageous in some cases for the first Web server 16 to transmit commands or otherwise instructed alterations to one or more of the DOM objects 30 or the corresponding attributes.

DOM changes may be implemented through the HCI 34 according to user interaction with the first Web browser 20. With respect to the video controls object, the HCI 34 may register user actuation of a play button to instigate playback of the video object that then changes a state of the video object to begin play of the video to the user as part of a second visual representation (not shown). The second visual representation may correspond with presentation of the Web page 12 after the first Web browser 20 identifies a change in one of the visually dependent DOM objects 30, e.g. the video object changing from a pause state to a play state. Each change in one or more of the DOM objects 30 having a resulting influence on the visual presentation may be considered as a new visual representation of the Web page 12. The first Web browser 20 may be configured to automatically detect changes in the DOM objects 30 and/or scripts associated with the first Web browser 20 or downloaded in conjunction with the Web page 12 may also be used to facilitate detecting and/or implementing changes related to the DOM objects 30. Once a change is detected, similar processes, scripts, etc. may be used by the first Web browser 20, or other features associated with the first client 14, to facilitate implementing a corresponding change in the presentation of the Web page 12, optionally with some of the changes being hidden or otherwise non-visual to the user. (Web pages are extremely diverse such that any number of operations may be desired in addition to those that are visible or apparent to a user.)

Figure 5:
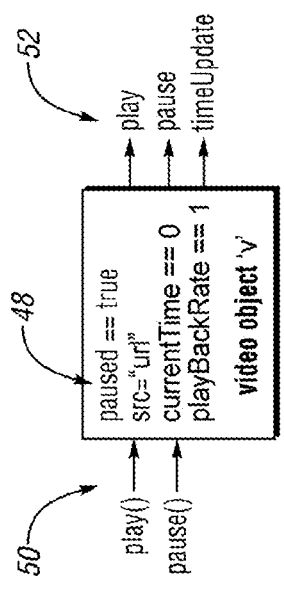
FIG. 5 schematically illustrates the video object in accordance with one non-limiting aspect of the present invention.

FIG. 5 schematically illustrates the video object in accordance with one non-limiting aspect of the present invention. The video object is shown to include a set of attributes 48 that reflect its internal states; optionally some of these attributes can be set by the first Web browser 20, the Web page 12 and/or JavaScript (or other type of script). The video object may include a set of functions 50 that can be called by JavaScript to change the object's state, i.e., to change an attribute from one of an available state to another available state. The video object may also include a set of events 52 that can be monitored by JavaScript as the object's internal state changes. FIG. 4 shows the video object being associated with an exemplary subset of play and/or pause functions 50 (arrows into the object); paused, source, current time and playback rate attributes 48 (name=value inside the object); and play, pause and time update events 52 (arrows out of the object). As an example, if the user clicks the mouse on the "play" video control in FIG. 3, the play( ) function of the video object will be called. The paused attribute will be set to false. The change of the value of the paused attribute will cause the play event to occur.

If the administration agent 18 registers to receive the play event, that function will learn when the video transitions from paused to playing, independent of what caused that transition. The administration agent 18 could set the currentTime attribute to the number of seconds corresponding to the middle of the video, which would cause the video playback to jump to that time. It would also cause a timeUpdate event to occur. It can be seen from the example that a administration agent 18 may be configured to manipulate an arbitrary DOM object 30 in the same way as a user causes to happen. The administration agent 18 can also learn of user (or other JavaScript function) interaction with the DOM 28. A point to note is that the set of DOM objects 30 corresponding to a Web page 12 may be created each time a new HTML page is loaded by the browser. Object interactions as described in the above example occur with the set of objects associated with the Web page 12. If the user clicked on the "Featured Video" link in FIG. 3, a new Web page would be loaded and the set of objects created for the previous page would be destroyed and a new set of objects would be created for that new page. It is possible for administration agent 18 on the Web page 12 to save arbitrary DOM object state across page reloads by storing that state information as a "cookie" or a local file. In browsers that support multiple browser windows via tabs or other mechanisms, each window may be considered as an independent entity having its own DOM.

The administration agent 18 contemplated by the present invention may include the JavaScript used to manipulate the DOM objects 30 and/or it may operate in cooperation with other such JavaScripts (Web browser may employ multiple JavaScripts, etc.). The administration agent 18 may be configured to receive instructions from other sources besides the HCI 34 and or the Web server 20 in order to facilitate changing or otherwise manipulating the DOM objects 30. The administration agent 18 may be an application or other instrument capable of receiving control messages from other entities desiring to control or manipulate the DOM objects 30 in order to facilitate a corresponding change in the presentation or operation of the Web page 12 as rendered by the first Web browser 20. The administration agent 18 and/or the first client 14 may include a bridge computer interface (BCI) to facilitate interfacing control messages and other messages over a bridge 54 between the first client 14 and a second client 56. The bridge 54 may be a Web socket, tunnel, XMLHttpRequest (XHR) architecture or other bi-directional communication medium sufficient to facilitate signaling exchange between the first client and the second client.

The bridge 54 may be associated with an application 59 configured to support maintenance of the session/communication range between the first and second clients 14, 56 and/or the application 59 may be associated with monitoring activity conducted through the bridge 54, e.g., to monitoring current state of a DOM 28 of the first client 14 and/or the second client 56. Amongst other potential capabilities, the bridge application 59 may be configured to: facilitate pairing of the controlling and controlled Web pages, e.g., by explicitly using 'id' or pre-configuration or implicitly by detected physical proximity or presence on the same local area network; facilitate control of the number of agents that may be interconnected; provide rules for interaction among agents, e.g. one-at-a-time, all-at-once; and provide rules for terminating the interconnectivity of the agents.

The second client 56 may be configured in a similar manner to the first client 14. The second client 56 is shown to also include its own version of a administration agent 58, a Web page 60, a DOM 62, DOM objects 64, Web browser 66, and HCI 68. (Hereafter, these elements when application to the first client are noted as "first" and as "second" when applicable to the second client). The second client 56 may operate similarly to the first client 14 at least with respect to being configured to facilitate download of the second Web page 60 from a second Web server 70 whereupon the second Web browser 66 operates similarly to create the local second DOM 62, second DOM objects 64 and/or second attributes for use in rendering a corresponding visual representation on a display 72 for a second user 76. The second DOM 62 may operate similarly to the first DOM 28 in that changes to the second DOM objects 64 and/or second attributes may result in corresponding visual and non-visual alterations to the visual representation of the Web page 60 at the second client 56. One non-limiting aspect of the present invention contemplates allowing the second client 56 to facilitate manipulation of the first DOM 28 in order to facilitate remote control, discovery, collaboration and service migration. In particular, the second administration agent 58 may be configured to facilitate communication of control messages with the first administration agent 16 in order to instruct manipulation of the first DOM 28.

The first administration agent 18 may be configured to publish a copy of the first DOM 28 currently active at the first client 14 to the second administration agent 58. The copy may represent each or a subset of first DOM objects 30 and corresponding first attributes as occurring at creation of the copy. The second administration agent 58 may cooperate with the second Web browser 66 to facilitate a visual representation of the copy. The visual representation of the copy may be useful in displaying controllable features to the second user 76. (In some cases, the second user 76 and the first user 26 may be the same person if the person is operating both of the first and second clients 14, 56, e.g., when the first client 14 is a television and second client 56 is a tablet or mobile device.) One of the first and second administration agents 18, 58 may be configured to identify suitable DOM objects 30 to be included in the copy or to be displayed to the second user 76 as being features that may be controllable. The visual representation of the copy may be used to display the controllable attributes of the first DOM 28 through the second client 56 in order to notify the second user 76 of one or more first DOM objects 30 that may be available for control. The second administration agent 58 may determine user manipulation of the first DOM objects 30 noted in the copy according to interaction of the second user 76 with the second HCI 68. When one of the first DOM objects 30 in the copy is altered through the second HCI 68 or a script or other element operating at the second client 56, the second administration agent 58 may send a corresponding control message to the first administration agent 18.

FIG. 6 illustrates a control menu 80 in accordance with one non-limiting aspect of the present invention. The control menu 80 may be presented through the second Web browser 66 to facilitate generating the control messages necessary to facilitate manipulating the first DOM 28. The control menu 80 may display a plurality of selectable buttons, menus or other features related to the first DOM objects 30 included within the copy. A control menu message may be provided from the first device 14 to specify the first DOM objects 30 and/or the first DOM objects 30 that are controllable through the control menu 80. The second Web browser 66 and/or the second administration agent 58 may be configured to determine user interaction with the control menu 80 and to generate corresponding control messages. The control messages may then be sent through a BCI associated with the second administration agent 58 for transmission over the bridge 54 and receipt at the first administration agent 18. The first administration agent 18 may be configured to process received control messages and to implement a corresponding adjustment to the first DOM 28, thereby resulting in a corresponding manipulation of the first Web page 12 being provided through the first client 14. This capability allows a user of the second client 76 to manipulate presentation of the first Web page 12 at the first client 14 without having to request the first Web server 16 to direct the manipulative presentation, i.e., without requiring the first Web server 16 to transmit messages or otherwise control the first Web browser 20 to make adjustments to one or more of the first DOM objects 30.

The control menu 80 presented at the second client 56, formatted as the Web page 60, is shown to include exemplary controls and is not necessary intended to limit the scope and contemplation of the present invention. In particular, the present invention contemplates generating any type of control menu or graphical user interface (GUI) sufficient to convey which one or more of the DOM objects 30 included in the copy are available for manipulation. Optionally, the application 59 associated with the bridge 54 may be configured to control the options made available at the second client 56, such as according to subscription services, quality of service (QOS) or other right/entitlements of a user identified to be operating the second client. In addition to facilitating remote control of the first DOM 28 from the second client 56, the capabilities of the present invention may also be useful in temporarily or permanently migrating services provided through the first client 14 to the second client 56. The migration may correspond with allowing access to the services currently being accessed or otherwise permitted for access through this first client 14 at the second client 56, e.g., to allow viewing of the video showing at the first client 14 through the second client 56.

Figure 7:
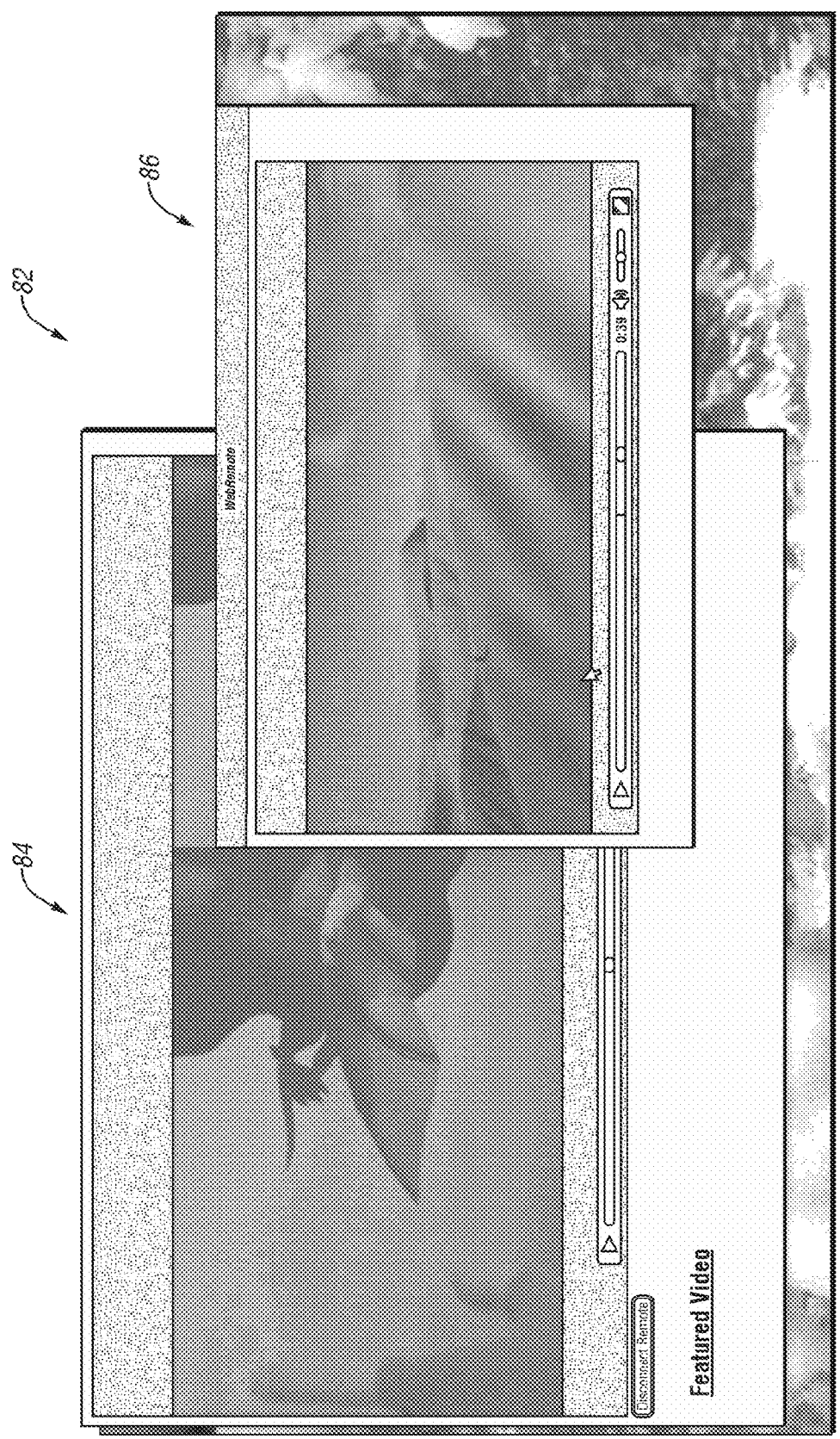
FIG. 7 illustrates a migration in accordance with one non-limiting aspect of the present invention.

FIG. 7 illustrates a migration 82 in accordance with one non-limiting aspect of the present invention. A first client visual representation 84 of a video is shown relative to a second client visual representation 86. The first client visual representation 84 may correspond with the video as played at the first client 14 using the first Web browser 20 and the second client visual representation 86 may correspond with the same video as being played through the second Web browser 66 of the second client 56. The first client visual representation 84 is shown to be paused while the second client visual representation 86 is shown to be actively playing the video. The video may be paused at the first client 14 through control messages originating at the second client 56, e.g., in response to the second user selecting a pause command through the control menu (see FIG. 5). Thereafter, the second client 56 may register user interaction with a transfer button included within the control menu. User selection of a transfer button may trigger the second administration agent 58 to communicate a corresponding control message to the first administration agent 18 that prompts the first administration agent 18 to adjust the first DOM 28 in order to facilitate further playback of the video at the second client 56, e.g., the video may be paused at the first client 14 and thereafter played through the second client 56. The video may be transferred through the bridge 54 and/or the second client 56 may contact the source of the video to facilitate further viewing.

Figure 8:
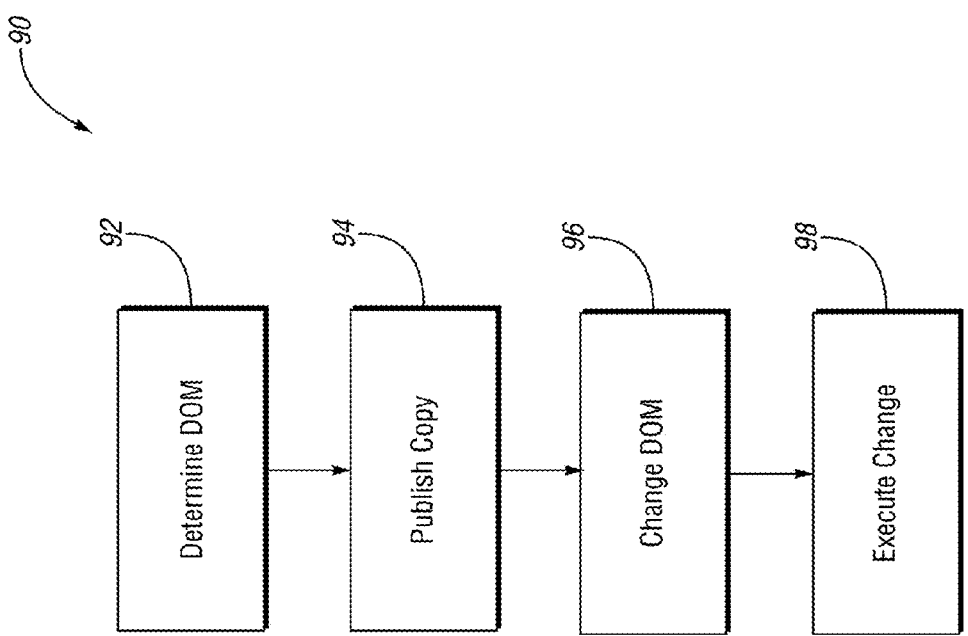
FIG. 8 illustrates a flowchart of a Web page control method in accordance with one non-limiting aspect of the present invention.

FIG. 8 illustrates a flowchart 90 of a Web page control method in accordance with one non-limiting aspect of the present invention. The method may be embodied in a computer-readable medium associated with one of the above-described clients, applications, Web servers, etc. The method is described with respect to facilitating control of a Web page rendered at a first client according to interactions occurring at a second client for exemplary non-limiting purposes. The present invention fully contemplates facilitating similar operations for Web pages in response to events other than those occurring at the second client. The method is described with respect to facilitating control of the Web page at the first client independently of a Web server from which the Web page was downloaded to the first client in order to demonstrate one advantageous aspect of the present invention with respect to facilitating control of Web pages without requiring Web servers and/or Web browsers to be modified or independently programmed to support the desired control.

Block 92 relates to determining a DOM at the first client or other device for which monitor and/or control is desired. The DOM is described as HTML is rather prevalent in the use of Web pages, however, the present invention is not necessary limited to facilitating monitor and/or control that is dependent on DOM as other types or configurations of module is similar to the DOM may be used. Block 94 relates to publishing a copy of the DOM to the second client or other device through which control of the first device is desired. The copy may include the DOM objects and/or attributes of the identified DOM as occurring at a time of generating the copy. The copy may be published by transmitting a message through a bridge or other medium connecting the first client with the second client, and optionally without relying on the Web server to communicate the copy. Block 96 relates to determining a desire to change one of the DOM objects included in the copy, such as through user interaction with a second Web page, second Web browser or other feature available at the second client. Block 98 relates to executing the change at the first client by transmitting a control message or other suitable signal to the first client representative of the change registered at the second client. Thereafter, the administration agent or other element operating at the first client may implement the DOM change in a manner that results in the corresponding Web browser performing a corresponding operation associated with the desired change.

As supported above, one non-limiting aspect of the present invention relates to a method where a Web page executing in Web browser can be monitored and controlled, without modification to the Web page, by a Web page on another browser or an external application. The invention defines a means whereby any Web page, a MSO Electronic Program Guide on a connected TV for example, can have an arbitrary portion of itself made available to another Web pages, a TV remote control app on a smartphone for example, so that the other Web pages can be informed of, and change, the state of the shared Web page. Several example use cases of this invention are: a Web page on a smartphone controlling a EPG Web page; transferring a service such as watching a video from the TV to a tablet; multiple users sharing a Web page and collaboratively interacting with it; and a home automation Web page running on a PC gathering information from Web enabled Smart Home devices.

The method for accomplishing exposure of the Web page to be shared, as contemplated by the present invention, may always be possible, independent of the application, and without requiring modification of the Web page. The invention contemplates: 1) a Web page with state and behavior that may be made available to other Web pages. This may be called the Server Web page. 2) Web pages that have access to and can modify the shared behavior and state. These may be called Client Web pages. A single Web page can act in the role of multiple Servers for state and behavior and as multiple clients. 3) A Web page Bridge that allows Servers and Clients to find and communicate with each other. 4) A protocol between Server and Clients for expressing events and state updates. The Server, Client and Bridge components in the invention are not limited to the use of this protocol.

A Web page may become a Server in accordance with the present invention by including server script functions, for example JavaScript, that: a) detect HTML Document Object Model (DOM) events for DOM objects that are to be shared with Clients, b) connect to a Bridge to establish communication with Clients, c) send detected events to Clients, d) receive messages from Clients. A Web page may become a Client in accordance with the present invention by including client script functions, for example JavaScript, that: a) connect to a Bridge to establish communication with a Server, b) receive and act on detected events from the server, c) maintain the portion of element state shared by the Server, d) send messages back to the Server to update the shared element state. A Bridge is contemplated that: a) allows Server and Clients to connect to a globally unique instance of the bridge for purposes of bi-directional communication of messages, b) informs a Server and Clients when there are new connections to the instance of the Bridge, c) passes any message from one connection on the instance of the Bridge to all other connections, d) informs the first Server or Client on the instance of the Bridge when there are no other connections, e) uses a network protocol for Server and Client connections, WebSockets for example, that allows Server and Clients to connect to the Bridge in a manner not limited by the Internet origin of the Server and Client Web pages and the Bridge. The invention can use other network protocols supported by browsers but there may be associated Internet origin restrictions. Servers may send clients messages consisting of: the server DOM object id, the event type (as defined in the HTML5 specification), a list of (attribute, value) pairs representing the shared state for the object id. The invention defines a new event type for a server to initialize the client. Clients receive these messages and create a remote representation of the object on the server. Clients send a server messages consisting of: the server object id, (attribute, value) pairs, object method names. The server uses these messages to update the DOM object.

The invention allow Script Functions to monitor and control a Web page without modifying the Web page. The invention introduces the idea of a bridge, independent of the Web server, that allows Web client applications to communicate with one another. This is a critical difference from an implementation that relies on a Web server backend application to create the client connections because the invention allows the Web page developer to add script to the web client for communication. This can then be delivered by any standard Web server without server side intervention. The invention also allows clients served from completely independent Web servers to communicate; something not possible if the page server is making the bridge. The invention shows how a protocol over this communication path can be used to link the state of DOM objects among the clients. The client applications do not have to be modified to interact.

The Web server/browser model contemplated by the present invention may be applied to delivering applications in diverse areas such as multimedia service, Internet of things and collaboration. These types of applications may desire the use of one Web page to communicate with another Web page for purposes such as remote control and sharing of information. The present invention contemplates a means for one Web page to create a window in another Web page and serve Web content to that window, however, the process describe above may be preferred because: a) the client knows what is being shared by virtue of the Bridge name, b) the client can communicate desired changes back to the server, c) it is application specific, and therefore completely extensible, how a client and server discover one another, d) it can be easily implemented.

At least one aspect of the present invention contemplates: a) any server DOM object can be shared with clients, b) the client can communicate desired object changes back to the server, c) and being application specific, and therefore completely extensible, what services can be shared. The present invention also contemplates a) defining how server and client applications find on another, b) defining how the client can communicate desired changes back to the server, c) and HTML DOM object state and behavior being shared rather than high level services.

All HTML elements used by a Web page for things such as showing a video, receiving user key, mouse or touch events, or communicating over the network may be implemented in accordance with the present invention with a standard DOM representation. Everything the user does or sees may be represented in the DOM. HTML5 may also be leveraged for JavaScript in a Web page to access this DOM information. New JavaScript can be added to the Web page that access some portion of the DOM objects representing the Web page A and user interaction to create a replica of what the user is doing and seeing.

An original Web page may remain unchanged. The selected portion of the DOM can be shared, in real time, using WebSockets or other suitable a bidirectional communication channel between a browser and a server. The information can be used by an application, for example as a measurements or verification tool. The Application and WebSocket server can collaborate to that the information from the shared DOM is accessible by another new Web page. The new Web page can change the DOM objects in other Web browser—these changes will effect what the Web browser user sees. An application bridge can be used to link a server and a client that use WebSockets (or other bidirectional communications such as XHR). The bridge can play a central role in how Web pages discover, address and communication with each other. A variety of discovery, security and other communication protocols can be provided by the bridge. The protocol used between the client and server can be custom to the application.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for remotely controlling a video playing within a first Web page of a first Web browser operating on a first device from a second device operating independently of the first device, the method comprising:
   determining one or more of a plurality of DOM objects for a document object model (DOM) generated at the first device to enable display of the first Web page, the plurality of DOM objects being used with the first Web browser to facilitate playing the video within the first Web page, the plurality of DOM objects including a video object associated with streaming or downloading the video from a Web server to the first device and a video control object associated with controlling playback of the video within the first Web page through corresponding manipulation of the video object, the video control object including a video function sufficient to instigate playing of the video when set to a first attribute and to pause playing of the video when set to a second attribute;
   determining the video function to be set to the first attribute at the first instance as a function of instructions included in a menu message wirelessly transmitted directly from the first device to the second device at a fifth instance occurring prior to the second instance such that the menu messages travels from the first device to the second device without being received at and independently of the Web server,
   presenting a control menu on the second device having one or more selectable buttons with a first button of the one or more selectable buttons indicating the video function to be set to the first attribute at a first instance in time;
   determining a user actuation of the first button at the second device at a second instance in time occurring after the first instance, the user actuation indicating via the second device a desire to control the video function from the first attribute to the second attribute;
   transmitting a control message from the second device to the first device at a third instance in time occurring after the second instance to cause the first Web browser to change the video function from the first attribute to the second attribute, thereby pausing play of the video within the Web page at a fourth instance in time occurring after the third instance; and
   presenting the control menu and determining the user actuation without contemporaneously displaying the video on the second device during any one of the first, second, third and fourth instances.

2. The method of claim 1 wherein the first device is a television and the second device is a tablet and the television and the tablet communicate over a local area network (LAN), and wherein the method further comprises transmitting the control message through an application bridge constructed over the LAN between the first device and the second device such that the control message travels from the tablet over the LAN through the application bridge for receipt at the television and without traveling further than the LAN.

3. The method of claim 2 further comprising:
   transmitting the control message through the application bridge without the control message being transmitted to the Web server; and
   pausing play of the video within the webpage at the fourth instance in response to receipt of the control message and without re-loading the first Web page such that the video function changes from the first attribute to the second attribute without the Web server correspondingly specifying the first or second attributes and without the Web server otherwise making adjustments to the plurality of DOM objects.

4. The method of claim 2 further comprising:
   transmitting the control message to the first Web browser from a second Web browser on the second device presenting the control menu;
   presenting a transfer button within the control menu on the second device as one of the one or more selectable buttons;
   determining a transfer actuation of the transfer button after the second instance in response to the user engaging the transfer button, the transfer actuation indicating the user desiring to subsequently playback the video via the second device;
   transmitting a transfer message from the tablet to the television at a fifth instance in time occurring after the fourth instance in response to the transfer actuation, the transfer message causing the television to thereafter transfer the video through the application bridge to the second Web browser for playback through the tablet such that play of the video appears on the tablet to be paused at a sixth instance in time occurring after the fifth instance; and
   determining a user actuation at the tablet sufficient to begin playback of the video at a seventh instance in time occurring after the sixth instance, and thereafter, instructing the television to continue transferring the video over the application bridge for subsequent playback at the tablet while the video is being contemporaneously streamed or downloaded to the television from the Web server, thereby playing the video through the tablet without the tablet contemporaneously streaming or downloading the video from the Web server.

5. The method of claim 1 further comprising presenting the control menu without displaying the video object at the second device during any one of the first, second, third and fourth instances.

6. The method of claim 1 further comprising:
   presenting the control menu with the first button having a play icon to convey the video function as being set to the second value at a sixth instance in time occurring prior to the first and fifth instances;
   visually varying the first button from the play icon to a pause icon at a seventh instance in response to receipt of the menu message, the seventh instance occurring after the sixth instance and prior to the second instance; and determining the user actuation to correspond with user selection of the pause icon presented during the seventh instance.

7. The method claim 6 further comprising visually varying the first button from the pause icon to the play icon at an eighth instance occurring after the seventh instance to indicate the first Web browser having changed the video function from the first attribute to the second attribute.

8. The method claim 7 further comprising varying the first button from the pause icon to the play icon at the eighth instance in response to the second device receiving an updated menu message transmitted from the first device confirming change of the video function from the first attribute to the second attribute.

9. The method claim 7 further comprising varying the first button from the pause icon to the play icon at the eighth instance automatically upon transmission of the control message to the first device such that the first button is changed from the pause icon to the play icon without requiring confirmation from the first device of the video function being change from the first attribute to the second attribute.

10. The method of claim 1 further comprising changing the video function from the first attributed to the second attribute in response to the control message using an administration agent operating on the first device, including the administration agent changing from the first attribute to the second attribute:
  i) without causing the first Web browser to correspondingly download or re-download the first Web page from the Web server;
  ii) without causing the first Web browser to correspondingly download or re-download the video function from the Web server; and
  iii) without causing the first Web browser to correspondingly re-populate the video function according to instructions or other information provided from the Web server.

11. A non-transitory computer-readable medium having non-transitory instructions stored thereon which when executed with a processor are sufficient to facilitate manipulating a first Web browser operating on a first device, the non-transitory computer-readable medium having non-transitory instructions for:
  determining a document object model (DOM) associated with a first Web page being displayed with the first Web browser, the DOM including a plurality of DOM objects used by the first Web browser to create a first visual representation of the first Web page;
  determining at least a subset of the plurality of DOM objects to be controllable DOM objects associated with a video object and a video control object, the video object being associated with a video sourced from a Web server and the video control object being associated with controlling playback of the video through the first Web page;
  generating a menu message for transmission from the first device to a second device sufficient for specifying the controllable DOM objects to include the video control object;
  transmitting the menu message and not the video object through a bridge constructed between the first device and the second device, the bridge facilitating signaling between the first and second device over a communication medium independent of the Web server from which the first device accesses the video; and
  altering at least one of the controllable DOM objects according to a control message received at the first device following transmission from the second device, the altering of the at least one of the DOM objects causing the first Web browser to create a second visual representation of the first Web page, the second visual representation differing from the first visual representation in accordance with the altering of the at least one of the controllable DOM objects.

12. The non-transitory computer-readable medium of claim 11 further comprising non-transitory instructions for:
  determining at least a portion of the plurality of DOM objects to be non-controllable;
  specifying the controllable and not the non-controllable DOM objects in the menu message;
  transmitting the menu message from the first device to the second device over a local area network (LAN) established therebetween such that the menu message passes directly from the first device to the second device independently of the Web server and without processor or receipt at the Web server; and
  receiving the control message directly from the second device through communication executed over the LAN such that the control message pass directly from the first device to the second device independently of the Web server and without processing or receipt at the Web server.

13. The non-transitory computer-readable medium of claim 11 further comprising non-transitory instructions for specifying the controllable DOM objects within the menu message in a manner sufficient for use with an administration agent associated with a second Web browser operating on the second device to create a third visual representation of the controllable DOM objects, the second device generating the control message in response to a user of the second Web browser interacting with one or more of the controllable DOM objects visually represented within the third visual representation, the third visual representation differing from the first and second visual representations.

14. The non-transitory computer-readable medium of claim 11 further comprising non-transitory instructions for altering one of the controllable DOM objects without re-loading the DOM and without re-downloading the first Web page from the Web server, the Web page being previously downloaded from the Web server to create the DOM associated with the first visual representation, thereby altering one of the controllable DOM objects without requesting the Web server to correspondingly re-populate the controllable DOM objects and without receiving instructions or other information from the Web server to facilitate correspondingly altering one of the controllable DOM objects.

15. A Web browsing system comprising:
  a gateway configured to demarcate and interface signaling between an inside network and an outside network;
  a television connected to the inside network and configured to enable download of a first Web page from a Web server connected to the outside network, the first Web page being sufficient to facilitate playback of a video from the Web server, the television including:
  i) a first Web browser configured to process the first Web page for playing of the video;
  ii) a first document object model (DOM) having a plurality of first DOM objects associated with rendering the first Web page, at least some of the first DOM objects having controllable attributes and at least some of the first DOM objects having non-controllable attributes, the first DOM operable for varying the video playing within the first Web page according to changes in the controllable attributes;
iii) a first human computer interface (HCI) for changing one or more of the controllable attributes as a function of user interaction with the first device;
iv) a first administration agent configured to differentiate the controllable and non-controllable attributes and specify one or more of the controllable attributes within a menu message, including specifying a first value for a first controllable attribute of the one or more controllable attributes; and
v) a first bridge computer interface (BCI) operable for:
  (1) transmitting the menu message through a first bridge created over the inside network; and
  (2) changing one or more of the controllable attributes as a function of a control message received through the first bridge;
a portable computer connected to the inside network and configured to enable download of a second Web page to facilitate controlling playback of the video at the first device, the portable computer including:
i) a second Web browser configured to process the second Web page for visual presentation of a control menu without visually presenting the video;
ii) a second document object model (DOM) having a plurality of second DOM objects associated with rendering the control menu, at least some of the second DOM objects having controllable menu attributes, the second DOM operable for varying the control menu according to changes in the corresponding controllable menu attributes;
iii) a second HCI operable to facilitate changing one or more of the controllable menu attributes rendered in the control menu as a function of user interaction with the control menu;
iv) a second administration agent configured to:
  (1) set one or more of the controllable menu attributes rendered in the control menu to match the controllable attributes specified within the menu message without visually presenting the video with the control menu, including setting a first controllable menu attribute of the controllable menu attributes to the first value specified in the menu message;
  (2) determining user interaction with the control menu sufficient to change the first controllable menu attribute from the first value specified in the menu message to a second value; and
  (3) generate the control message with instructions sufficient for instructing the television to change the first controllable attribute from the first value to the second value;
v) a second BCI operable to facilitate receiving the menu message and transmitting the control message through the first bridge to the television, the control message causing the television to change the first controllable attribute from the first value to the second value and correspondingly vary the video playing in the first Web page, thereby enabling the portable computer to vary the video playing in the first Web page without visually presenting or otherwise displaying the video.

16. The system of claim 15 wherein the first administration agent is changes the first controllable attribute from the first value to the second value without requiring the television to contemporaneously download the Web page or the control message from the Web server and without the television requesting the Web server to correspondingly re-populate the first DOM objects.

17. The system of claim 15 wherein the first bridge is a Web socket configured to facilitate signaling between the television and the portable computer over the inside network independently of the outside network and the Web server such that the first BCI receives the control message without contemporaneously communicating with the Web server.

18. The system of claim 17 wherein:
the second HCI displays a transfer button within the second Web page;
the second administration agent transmits a transfer message through the first bridge upon determining user selection of the transfer button; and
the first administration agent transfers the video presented in the first video through the first bridge for presentation through the second Web page in response to the transfer message, wherein the first administration agent transfers the video through the bridge independently of the Web server such that the video is presented in the second Web pace without being transmitted thereto from the Web server.

19. The system of claim 15 wherein the first administration agent is configured to specify the one or more controllable attributes within the menu message and not the non-controllable attributes.

* * * * *